United States Patent
Kang et al.

(10) Patent No.: US 6,650,911 B1
(45) Date of Patent: Nov. 18, 2003

(54) SECTORED ARRAY ANTENNA CDMA SYSTEM FOR IMPROVED SOFTER HANDOFF

(75) Inventors: Yang Gi Kang, Taejon (KR); Mun Geon Kyeong, Taejon (KR); Youn Ok Park, Taejon (KR); Kyung Hi Chang, Taejon (KR); Seong Rak Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/409,815

(22) Filed: Sep. 30, 1999

(30) Foreign Application Priority Data

Nov. 26, 1998 (KR) .............................. 98-51094

(51) Int. Cl.$^7$ ................................................ H04B 1/38
(52) U.S. Cl. ...................................... 455/562; 455/442
(58) Field of Search ................................ 455/562, 442, 455/436, 272, 273

(56) References Cited

U.S. PATENT DOCUMENTS

| | | | |
|---|---|---|---|
| 5,602,555 A | 2/1997 | Searle et al. | 342/374 |
| 5,621,752 A | 4/1997 | Antonio et al. | 375/200 |
| 5,748,683 A | 5/1998 | Smith et al. | 375/347 |
| 6,127,972 A | * 10/2000 | Avidor et al. | 342/373 |
| 6,167,036 A | * 12/2000 | Beven | 370/331 |
| 6,377,812 B1 | * 4/2002 | Rashid-Farrokhi et al. | 455/522 |
| 6,463,301 B1 | * 10/2002 | Bevan et al. | 455/562 |

OTHER PUBLICATIONS

Gilhousen et al., "On the Capacity of a Cellular CDMA System," *IEEE Transactions on Vehicular Technology*, 40(2):303–312, May 1991.

Naguib et al., "Capacity Improvement with Base–Station Antenna Arrays in Cellular CDMA," *IEEE Transactions on Vehicular Technology*, 43(3):691–698, Aug. 1994.

Naguib and Paulraj, "Performance of Wireless CDMA and M–ary Orthogonal Modulation and Cell Site Antenna Arrays," *IEEE Journal on Selected Areas in Communications*, 14(9):1770–1783, Dec. 1996.

Thompson et al., "Smart Antenna Arrays for CDMA Systems," *IEEE Personal Communications*, pp. 16–25, Oct. 1996.

Guo et al., "An Adaptive Antenna for CDMA," *IEEE*, pp. 590–594, 1998.

* cited by examiner

*Primary Examiner*—Thanh Cong Le
*Assistant Examiner*—Nick Corsaro
(74) *Attorney, Agent, or Firm*—Seed IP Law Group PLLC

(57) ABSTRACT

A sectored antenna system to optimize the distance between adjacent sensors of an array antenna in a CDMA mobile communication system in which success rate of softer handoff and antenna gain is increased and power consumption of terminals may be evenly distributed. In the CDMA mobile communication system, a cell is divided into a number of sectors. A sector antenna system comprising a number of linear array antennas, in which distance between the antenna sensors is determined in consideration of overlapping angle of beams to supply softer handoff is provided. The system also includes carrier demodulators, matched filters, a weight vector estimator, weight vector multipliers, weight vector combiners, parallel demodulators, and a signal combiner.

6 Claims, 6 Drawing Sheets

SECTORED ARRAY ANTENNA CDMA SYSTEM FOR IMPROVED SOFTER HANDOFF

TECHNICAL FIELD

The present invention relates to a sectored antenna system, and more particularly to a sectored array antenna system used in CDMA mobile communication systems, which provides high success rate of softer handoff and high antenna gain.

BACKGROUND OF THE INVENTION

The growing interest in supporting voice and image services over wireless medium demands increased capacities of mobile communication systems. In current cellular mobile communication systems, the cell site receives and transmits signals in an omni-direction. Digital cellular mobile communication systems divide wide areas into a number of cells, and communications are accomplished between the cell station and a number of mobile stations. Information signals are transmitted and received in analog or digital form through wireless communication channels.

Generally speaking, the wireless communication channel from the cell station to the mobile station is called forward link, while the wireless communication channel from the mobile station to the cell station is called reverse link. The cell station transmits a number of multiplexed signals to mobile stations and receives signals transmitted from a number of mobile stations simultaneously. To accomplish these complex objectives, multiple access methods or multiplexing methods are required.

As multiple access methods, FDMA (frequency division multiple access), TDMA (Time Division Multiple Access), and CDMA (Code Division Multiple Access) are available. Furthermore, it is known that in the light of capacity, CDMA method is better than the other multiple access methods. One good reference is "On the capacity of a cellular CDMA system", K. S. Gilhousen, I. M. Jacobs, R. Padovani, A. Viterbi, L. A. Weaver, C. Wheatly, IEEE Transaction of Vehicle Technology, vol.40, No.2.

CDMA systems allocate unique pseudo noise code (PN code) to each user and transmit band spread signals. Receivers use the same code as the PN code in order to despread band spread signals.

CDMA systems determine system capacity on the basis of the received amount of interference. The CDMA system manipulates the sectorization method to increase system capacity. As a result, received amount of interference is decreased. A sectorization method requires installing a sector antenna at a cell station that receives signals in a limited directional range. However, increasing the number of users and their expectation for high quality service demands new communication systems with better capacity than conventional systems. More recently, spatial and temporal signal processing using a smart antenna has been proposed as a good technique in increasing system capacity. An array antenna has been proposed as well.

The array antenna is composed of several antenna sensors and constitutes a narrow beam in the direction of signal-source to suppress signals of other users. A typical antenna array consists of a number of antenna sensors coupled together via some forms of amplitude and phase shifting network to generate a single output. Several shapes of the antenna sensors are common. For example, uniform linear, circular, and planar arrays are available.

FIG. 1 is a diagram illustrating the operation of a sector antenna system in CDMA communication systems with a cell divided into 3 sectors. As shown in the figure, an array antenna 10 is installed at each sector and a beam 11 is constituted for communication with each mobile station.

If the type of signal wave projected to the array antenna 10 is assumed as a plane wave, a steering vector is obtained by equation 1.

$$a(\theta) = \left[ 1 \, \mathrm{Exp}\left(-j\frac{2\pi d}{\lambda}\sin\theta\right) \mathrm{Exp}\left(-j\frac{4\pi d}{\lambda}\sin\theta\right) \ldots \mathrm{Exp}\left(-j\frac{2(M-1)\pi d}{\lambda}\sin\theta\right) \right] \quad \text{[Equation 1]}$$

where d is the distance between adjacent antenna sensors (DBAAE); $\lambda$ is the wavelength of the transmitted signal; $\theta$ is an incidence angle $\theta$.

The permissible value that the phase $$\frac{2\pi d}{\lambda}\sin\theta$$

may assume lies inside the range $-\pi$ to $\pi$. This means that we must choose the spacing $$d \leq \frac{\lambda}{2\sin\theta},$$

so that there is a one-to-one correspondence between the value of the incidence angle $\theta$ and the phase $$\frac{2\pi d}{\lambda}\sin\theta$$

without ambiguity.

FIG. 2 is a diagram illustrating the operational range of a sector array antenna. As shown in the figure, when incidence angle $\theta$ lies inside the range between $-\theta_m$ and $\theta_m$, the maximum value of d is $$\frac{\lambda}{2\sin\theta_m}.$$

Here, the incidence angle $\theta_m$ does not exceed $$\frac{\pi}{2}$$

in maximum.

In mobile communication systems, when a mobile station escapes from the service area of a cell station and gets into another cell, the handoff function enables users to maintain communications. Two methods such as hard handoff and soft handoff are available.

For an analog cellular system, hard handoff is used. In hard handoff, before establishing a new communication channel, the existent link has to be disconnected. Therefore, signal quality gets degraded since communication is lost for a short amount of time when handoff occurs.

On the contrary, in digital cellular system, when a mobile station escapes from the service area of a cell station and moves into another cell area, an additional link is established with a new cell station without losing the existent link with the former cell station. In other words, the handoff process is composed of the following procedures in CDMA mobile communication systems. First, a communication channel with a cell station is established. Second, another communication channel is established with a new cell station without losing the existent communication channel. Third, the existent channel is disconnected. This handoff process is called soft handoff. Main advantages of soft handoff are that the probability of unwanted call termination is low and users don't even realize if handoff has happened because at least a communication link is kept during the communication.

In addition, when a mobile station is moving from one sector to another sector, similar process to the soft handoff process occurs. This process is called softer handoff. In softer handoff, the receiver at cell station diversity combines received signals and demodulates them.

FIG. 3 is a diagram illustrating a CDMA communication system in a case that one cell is divided into three sectors and a softer handoff occurs. The ranges of transmitted and received beams of each sector antenna are overlapped to perform softer handoff between adjacent sectors. In the figure, a reference numeral 30 is designated to the area where softer handoff occurs, 31 is to the area where beams are overlapped between sector 1 and sector 2, and 32 is to the inside angle between the central axis of sector 1 and the distal side of the overlap area 31 for illustrating that sector 1 and sector 2 are overlapped with the angular degree of 10.

Under the assumption that system capacity is to be guaranteed, studies regarding how to arrange antenna sensors in an antenna array have been performed in order to expedite softer handoff process.

SUMMARY OF THE INVENTION

The present invention provides a sectored array antenna system for CDMA mobile communication systems, which has the optimal distance between antenna sensors.

Advantages of the present invention are that success rate of softer handoff and antenna gain is increased and power consumption of terminals may be evenly distributed. In CDMA mobile communication systems, a cell is divided into a number of sectors. The present invention provides a sector antenna system, which is composed of a number of linear array antennas and distance between adjacent antenna sensors is determined in consideration of the overlapping angle of beams generated by softer handoff. The present invention may also include carrier demodulators, matched filters, a weight vector estimator, weight vector multipliers, weight vector combiners, parallel demodulators, and a signal combiner.

In accordance with the present invention, distances between adjacent antenna sensors are determined by the following equation:

$$0.4\lambda \le d \le \frac{\lambda}{2\sin\left(\frac{\pi}{S} + \theta_S\right)}$$

where d is the distance between adjacent antenna sensors, $\lambda$ is the wavelength of the transmitted signal, S is the number of sectors, and $\theta_s$ is beam overlapping angle.

BRIEF DESCRIPTION OF THE DRAWINGS

Preferred embodiments of the present invention will be explained with reference to the accompanying drawings, in which:

FIGS. 5A through 6B are graphs illustrating results of the disclosed embodiment of the present invention, in which FIG. 5A illustrates directivity pattern of the array antenna with the range of incidence angle of the signal source from $-70°$ to $70°$ and $d=0.5\lambda$.

FIG. 6B illustrates power consumption in accordance with location of the mobile station resulted from the pattern of FIG. 6A.

DETAILED DESCRIPTION OF THE PREFERRED EMBODIMENTS

According to the embodiment described herein, distance between adjacent sensors in the array antenna is designed to avoid spatial aliasing and meet the condition described in equation 2:

$$d \le \frac{\lambda}{2\sin\theta} \qquad \text{[Equation 2]}$$

If the incidence angle of user signals $\theta$ is between $-\pi/2$ and $\pi/2$, then the distance between adjacent antenna sensors should be kept to $d \le \lambda/2$. However, if the cell is divided into S sectors, the incidence angle gets narrows from $-\pi/S$ to $\pi/S$.

The maximum distance between adjacent sensors in order to avoid spatial aliasing is $$\frac{\lambda}{2\sin\frac{\pi}{S}}.$$

However, in CDMA communication systems, when the cell is divided into S sectors, beam-overlapping is required for softer handoff. Therefore, beam-overlapping angle ($\theta_s$) is required to be considered and then the maximum distance between adjacent sensors is qualified by Equation 3:

$$d \le \frac{\lambda}{2\sin\left(\frac{\pi}{S} + \theta_S\right)} \qquad \text{[Equation 3]}$$

Then, the range of incidence angle is $$\left[-\left(\frac{\pi}{S} + \theta_S\right), \left(\frac{\pi}{S} + \theta_S\right)\right].$$

Figure 1:
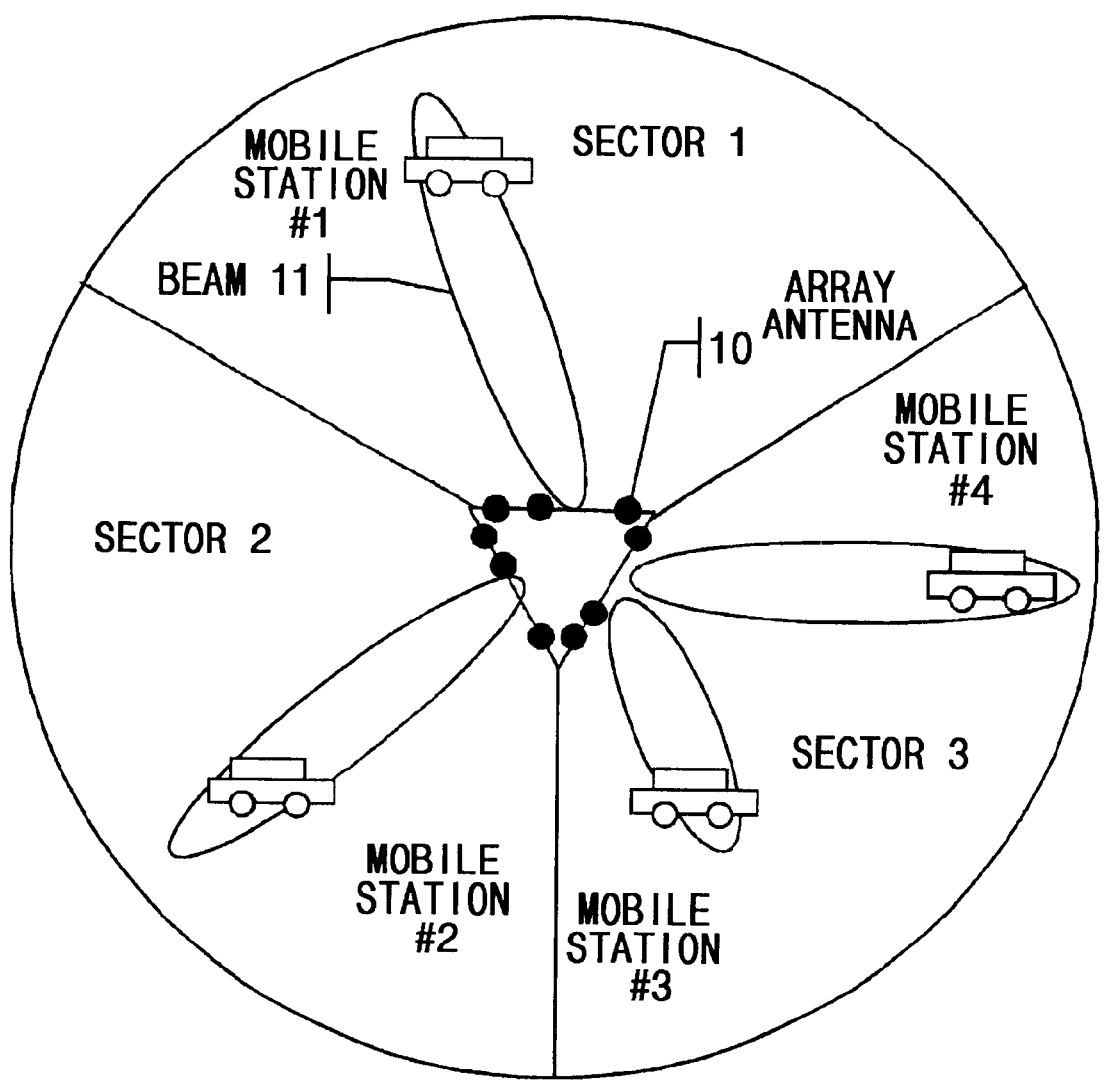
FIG. 1 is a diagram illustrating the operation of a sector antenna system in CDMA communication systems with a cell divided into three sectors.
Figure 2:
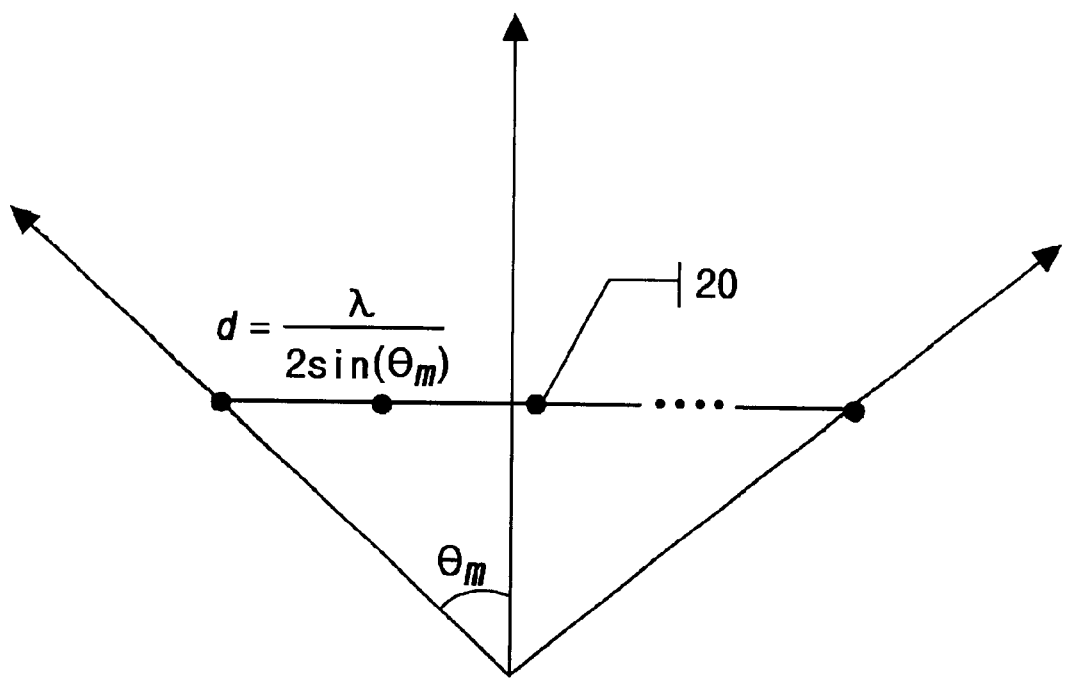
FIG. 2 is a diagram illustrating the operational range of a sector array antenna.
Figure 3:
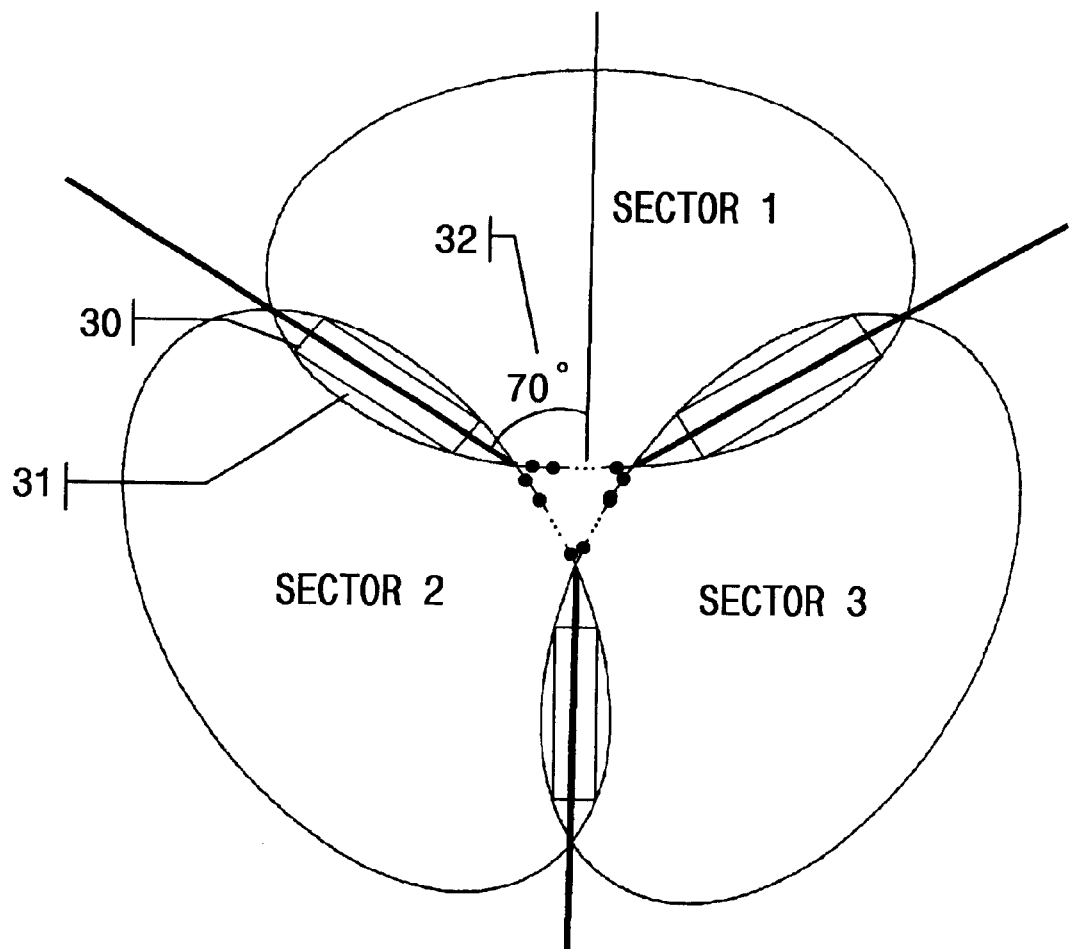
FIG. 3 is a diagram illustrating a CDMA communication system in a case that a cell is divided into three sectors and softer handoff occurs.
Figure 4:
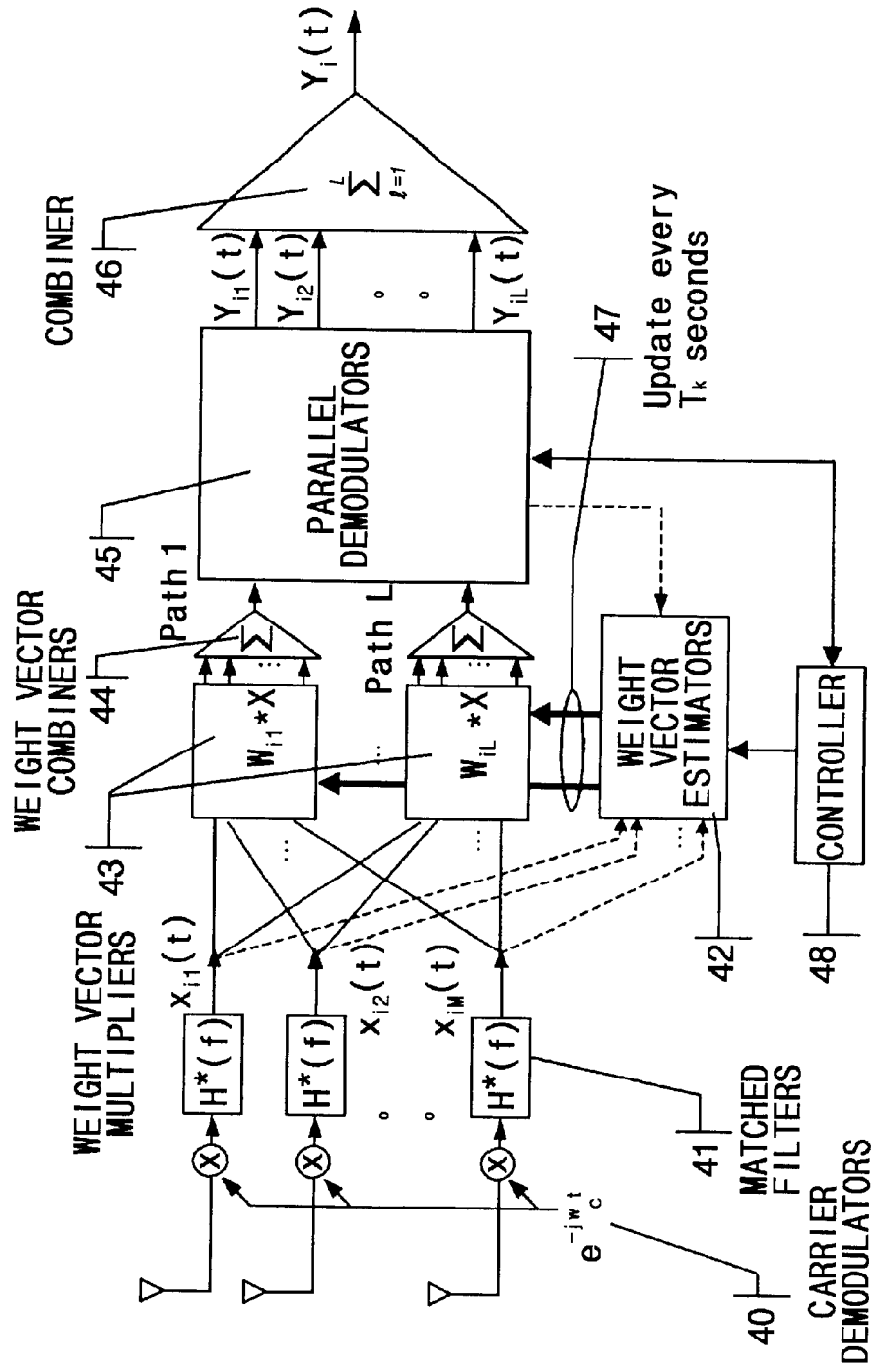
FIG. 4 is a block diagram illustrating the demodulation of signals of user i using an array antenna according to a disclosed embodiment of the present invention.

FIG. 4 is a block diagram illustrating the demodulation of signals of the user i using an array antenna according to a preferred embodiment of the present invention. As shown in the figure, it is composed of M carrier demodulators 40, M matched filters 41, an L weight vector estimator 42, L weight vector multipliers 43, L weight vector combiners 44, L parallel demodulators 45, and a signal combiner 46.

Input signals from M antenna sensors are demodulated by the demodulators 40 and then filtered by the matched filters 41. Output signals of the matched filters 41 are supplied to the weight vector estimator 42 and then used as the snapshot vector to generate beams.

In addition, output signals of the matched filters 41 are multiplied with weight vector by L weight vector multipliers 43. Then they are combined by L weight vector combiners 44.

Signals combined by L weight vector combiners 44 are demodulated by L parallel demodulators 45. Data passed through L parallel demodulators 45 may be used in the L weight vector estimator 42. The signal combiner 46 combines multi-path signals.

The weight vector that is used for beam generation is repeatedly updated after a certain amount of time 47 ($T_k$) and a controller 48 controls overall operation of circuit.

Figure 5A:
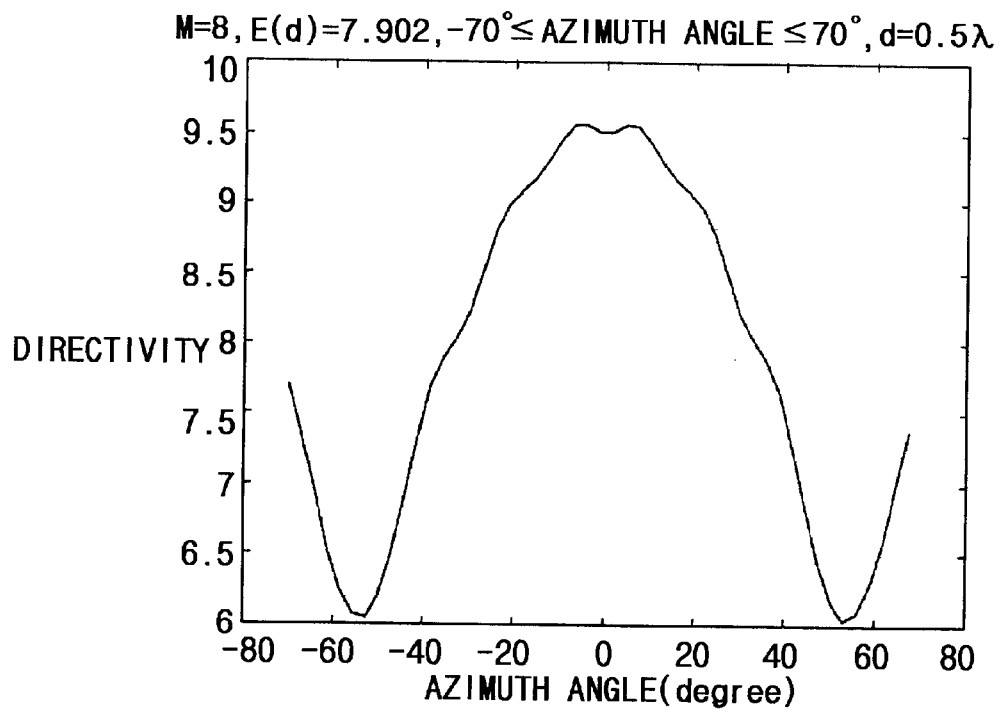

FIG. 5A is a graph illustrating the directivity pattern of the array antenna with the range of incidence angle of the signal source from −70° to 70° and d=0.5λ. Average directivity E(d) is 7.902.

Since antenna gain is the product value of directivity and power consumption, the pattern of antenna gain would be similar to the directivity pattern. As shown in FIG. 5A, antenna gain has the best value when azimuth angle is 0° and antenna gain has the worst value when azimuth angle is 53°.

Figure 5B:
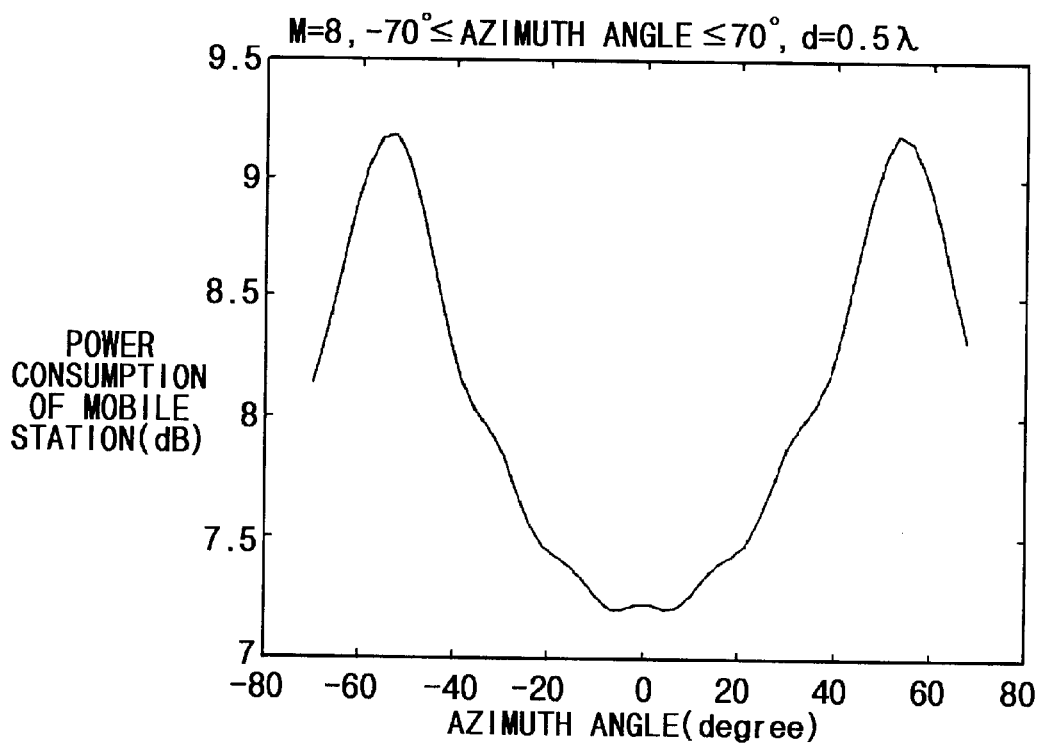
FIG. 5B illustrates power consumption in accordance with location of the mobile station resulted from FIG. 5A.

FIG. 5B is a graph illustrating power consumption in accordance with location of a mobile station resulting from FIG. 5A. As shown in the figure, power consumption has the smallest value when azimuth angle is 0°.

In softer handoff, since two sectors receive signals from a mobile station and combine them independently, there is more gain than in a communication system without softer handoff by 3dB. Therefore, mobile stations located at the boundary area of sectors like ones around [−70°, −50°] and [+70°, +50°] consume less power by 3dB when they are equipped with softer handoff capability.

Figure 6A:
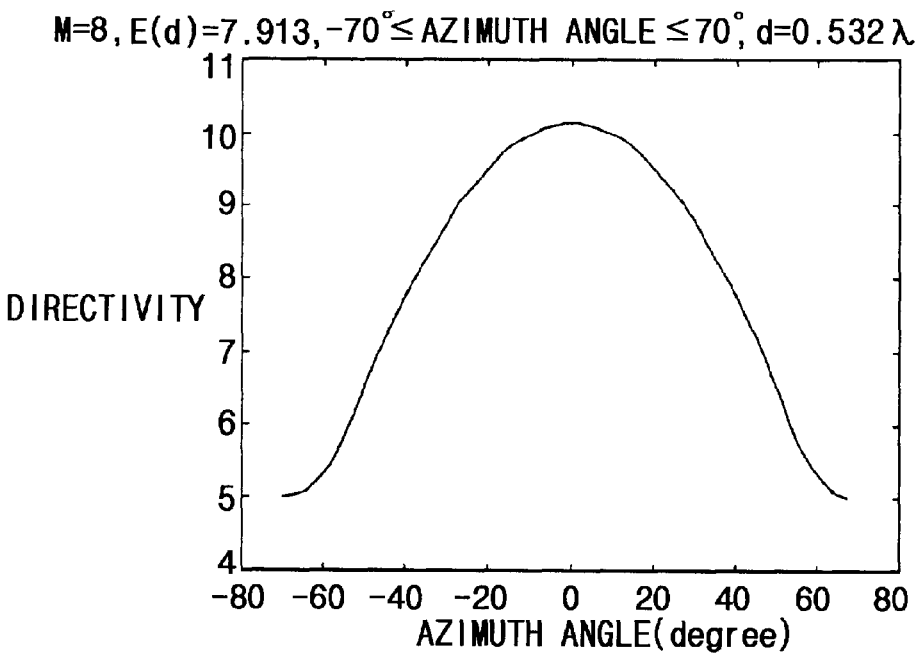
FIG. 6A illustrates directivity pattern of the array antenna with the range of incidence angle of the signal source from $-70°$ to $70°$ and $d=0.532\lambda$.

FIG. 6A is a graph illustrating the directivity pattern of an array antenna with the range of incidence angle of the signal source from -700 to 700 and d=0.532 A. In this case, it is shown that antenna gain is decreased as the azimuth angle increases. Average directivity E(d) is 7.913.

Figure 6B:
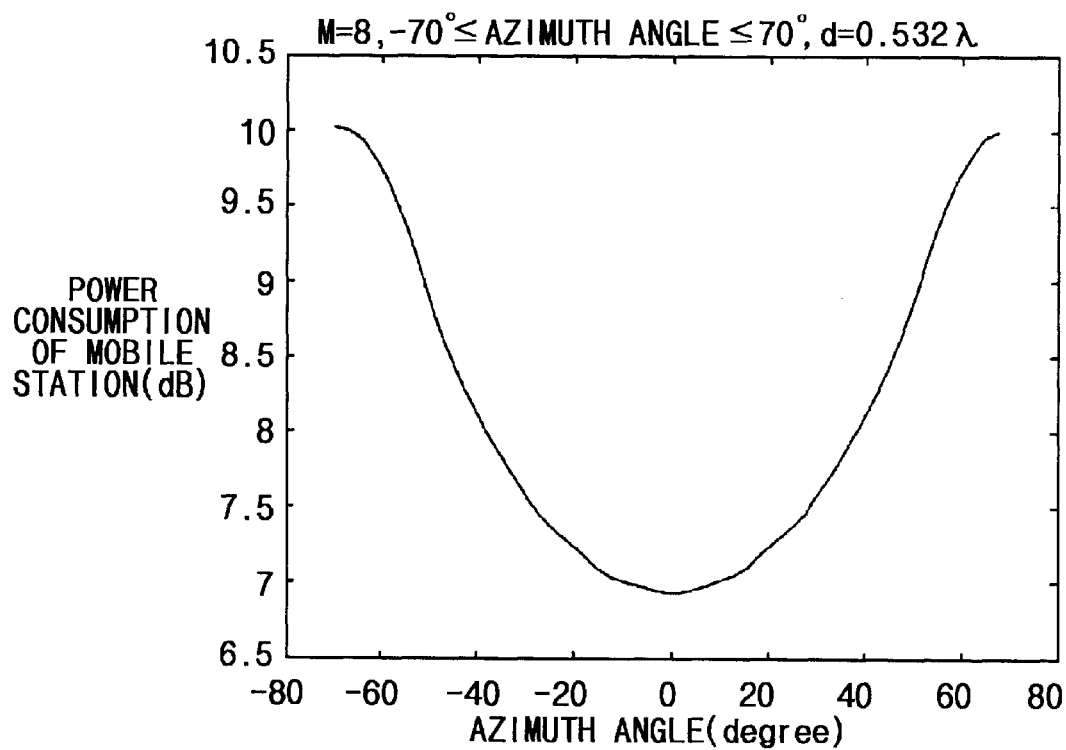

FIG. 6B is a graph illustrating power consumption in accordance with the location of a mobile station resulted from FIG. 6A. When azimuth angle is 0°, the value of power consumption has the smallest value. As shown in the case of d=0.5λ, mobile stations located at the boundary area of sectors like the ones around [−70°, −50°] and [+70°, +50°] consume less power by 3dB when they are equipped with softer handoff capability.

The case with d=0.532 2 λ shows a better situation than the case with d=0.5 λ. This is because in the case of d=0.532 λ, relatively mobile stations transmit high powered signals and distribution of consumption caused by location of a mobile station is minimal.

The disclosed embodiment of the present invention provides ways to optimize distances between adjacent sensors of an array antenna with S sectors. Advantages are that the success rate of softer handoff and antenna gain is increased and power consumption of terminals may be evenly distributed.

Although preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A sectored array antenna system in a CDMA mobile communication systems with each cell divided by a number of sectors having a plurality of linear array antennas, the system comprising a plurality of antenna sensors, wherein the distance between adjacent antenna sensors is determined by the following equation to supply a softer handoff:

$$0.4\lambda \le d \le \frac{\lambda}{2\sin\left(\frac{\pi}{S} + \theta_S\right)}$$

where d is the distance between adjacent antenna sensors, λ is the wavelength of the transmitted signal, S is the number of sectors, and $\theta_s$ is beam overlapping angle.

2. The sectored array antenna system in CDMA mobile communication systems of claim 1, wherein the distance between adjacent antenna sensors is determined by the following equation:

$$d = \frac{\lambda}{2\sin\left(\frac{\pi}{S} + \theta_S\right)}$$

where d is the distance between adjacent antenna sensors, λ is the wavelength of the transmitted signal, S is the number of sectors, and $\theta_s$ is beam overlapping angle.

3. The sectored array antenna system in CDMA mobile communication systems according to claim 1, wherein the system further comprises:

a plurality of carrier demodulators for demodulating input signals from said antenna sensors;

a plurality of matched filters for filtering signals from said carrier demodulators;

a plurality of weight vector multipliers for multiplying output signals of said matched filters with weight vector;

a plurality of weight vector combiners for performing preprocessing output signals of said weight vector multipliers; and a plurality of demodulators for demodulating output signals of said weight vector combiners.

4. The sectored array antenna system in CDMA mobile communication systems of claim 3, wherein the system further comprises a weight vector estimator for receiving signals from said matched filters and generating weight vector.

5. The sectored array antenna system in CDMA mobile communication systems of claim 3, wherein said demodulators comprise parallel demodulators.

6. The sectored array antenna system in CDMA mobile communication systems of claim 3, wherein the system further comprises a signal combiner for combining multi-path signals passed through said demodulator.

* * * * *